Figure 1:
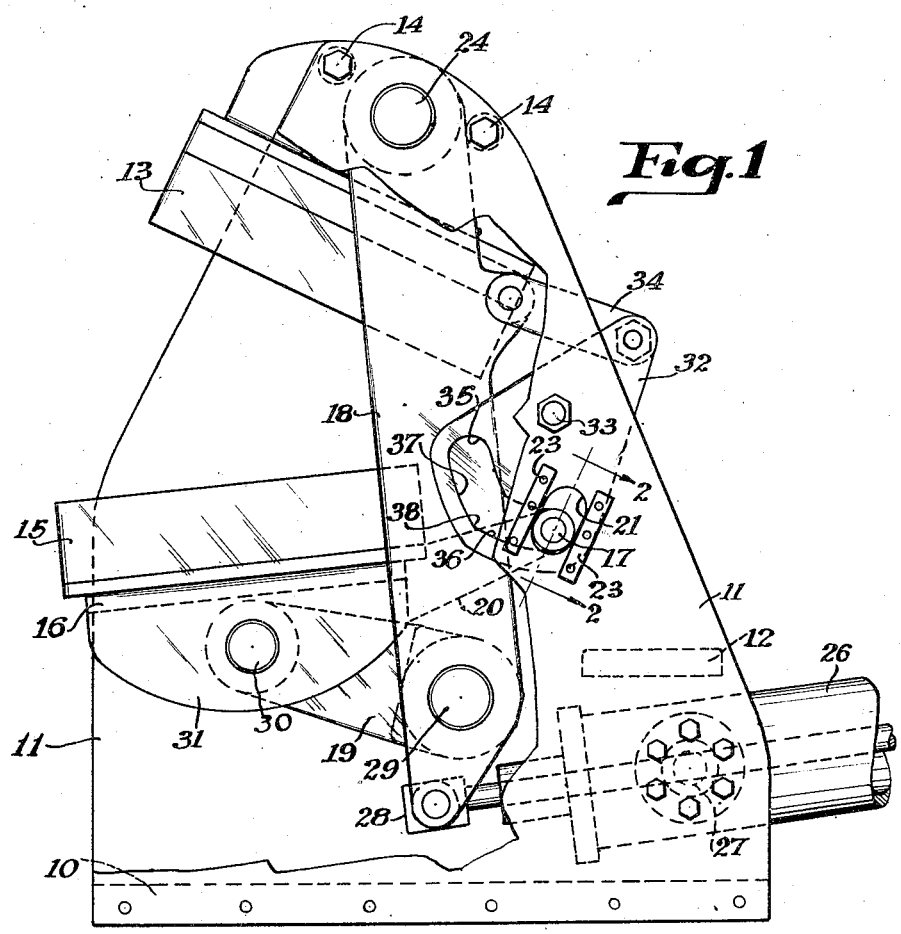

June 15, 1948.  J. W. BRUNDAGE  2,443,573
PRESS

Filed Nov. 14, 1945  4 Sheets-Sheet 1

INVENTOR.
JAMES W. BRUNDAGE.
BY Bates, Teare & McBean.
attorneys.

June 15, 1948. J. W. BRUNDAGE 2,443,573
PRESS
Filed Nov. 14, 1945 4 Sheets-Sheet 4

INVENTOR.
JAMES W. BRUNDAGE.
BY
Bates, Teare & McBean.
Attorneys.

Patented June 15, 1948

2,443,573

UNITED STATES PATENT OFFICE 2,443,573

PRESS

James W. Brundage, Akron, Ohio, assignor to The Akron Standard Mold Company, Akron, Ohio, a corporation of Ohio Application November 14, 1945, Serial No. 628,588

5 Claims. (Cl. 18—17)

This invention relates to molding and vulcanizing presses for mechanical rubber goods and particularly to those wherein the mating mold sections are relatively movable, one of the sections being tiltable with reference to the other so as to facilitate the insertion and withdrawal, by an operator, of an article to be operated upon by the press.

In the manufacture of mechanical rubber goods, it is desirable that the mating mold sections move in a rectilinear path during the final closing motion and initial opening motion, and it is also desirable that the operating mechanism be so arranged that a continuing pressure may be exerted upon the mold sections so as to follow up the article as the shape of the rubber is altered during the vulcanizing operation. This is distinguished from the operation of vehicle tire presses where the mold sections are locked mechanically before pressure is applied internally of the mold sections against the tire. It is additionally desirable in presses for making mechanical rubber goods that the mold sections be arranged to swing or tilt after they have been opened to a predetermined extent so as to make it convenient for the operator to remove the finished articles and to insert a fresh supply within the mold sections.

The problem presented, therefore, was to so mount the movable mold member that it would tilt away from the fixed member when fully open, and, when closing, would tilt back into parallelism with it and thenceforth move normal to the parallel faces until the mold was fully closed. The object of the present invention is to provide in simple and rugged form a supporting linkage which will control the path of movement in the manner just stated.

A press made according to the present invention is designed to obtain the desired order of swinging and rectilinear movement of the movable mold section during the closing movement of the press, and is also designed to maintain a constant application of closing pressure against the movable mold section until the completion of the vulcanizing operation. The final closing movement is accomplished just before the power actuated toggle mechanism reaches a dead center position, and in this way a constant pressure is maintained by the source of power against the mold sections.

A toggle mechanism is well suited for effecting the opening and closing of the mold sections because as the toggle members approach a dead center position, it is possible to obtain a large sealing pressure which is necessary to assure a flow of the rubber into all parts of the mold during the vulcanizing operation. The present invention provides a system of linkage by means of which the desired movement of a mold section may be obtained. The mechanism is so arranged that the hinged end of the movable mold section remains substantially stationary whenever the mold sections are held apart sufficiently to avoid interference therebetween, whereby the movable section is caused to travel in a curved path and to tilt away from the fixed section. Upon close approach, however, of the mold sections, the hinge pin is caused to travel parallel to and at an equal speed with the moving mold section, and thus to cause it to move in a rectilinear path normal to the meeting faces of the mold members.

Figure 2:
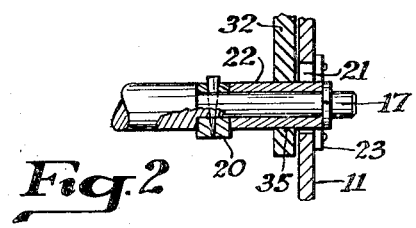
Figure 3:
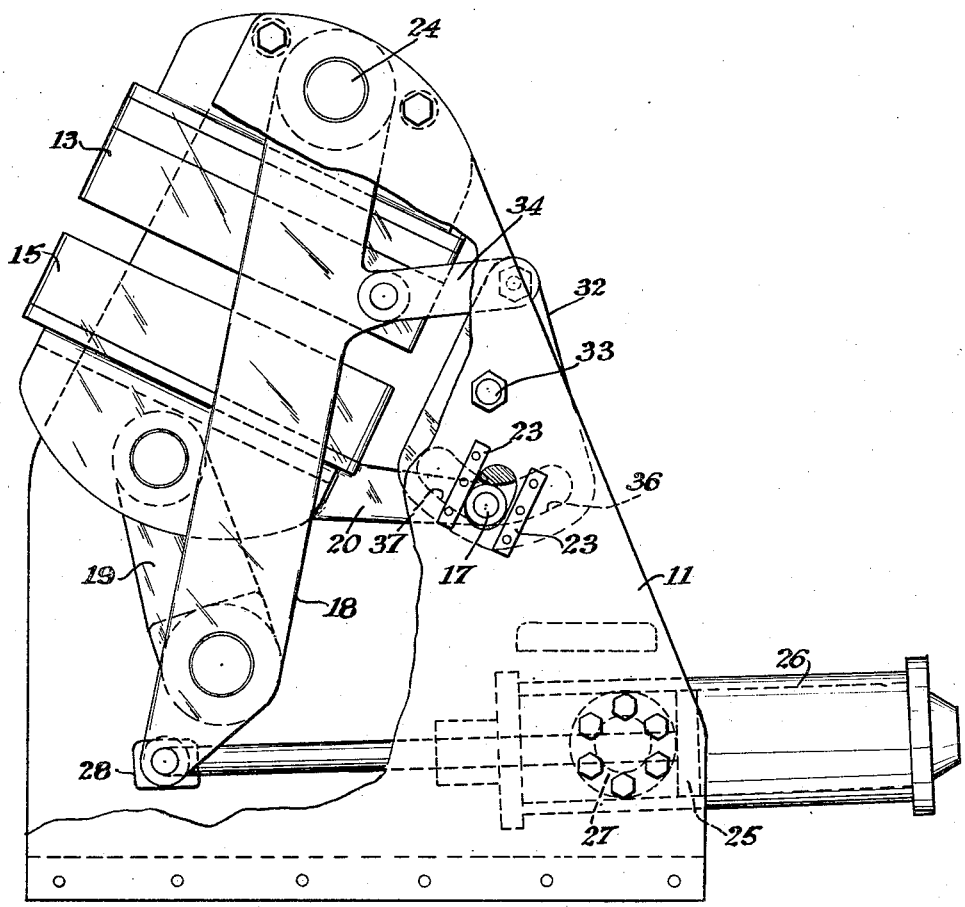
Figure 4:
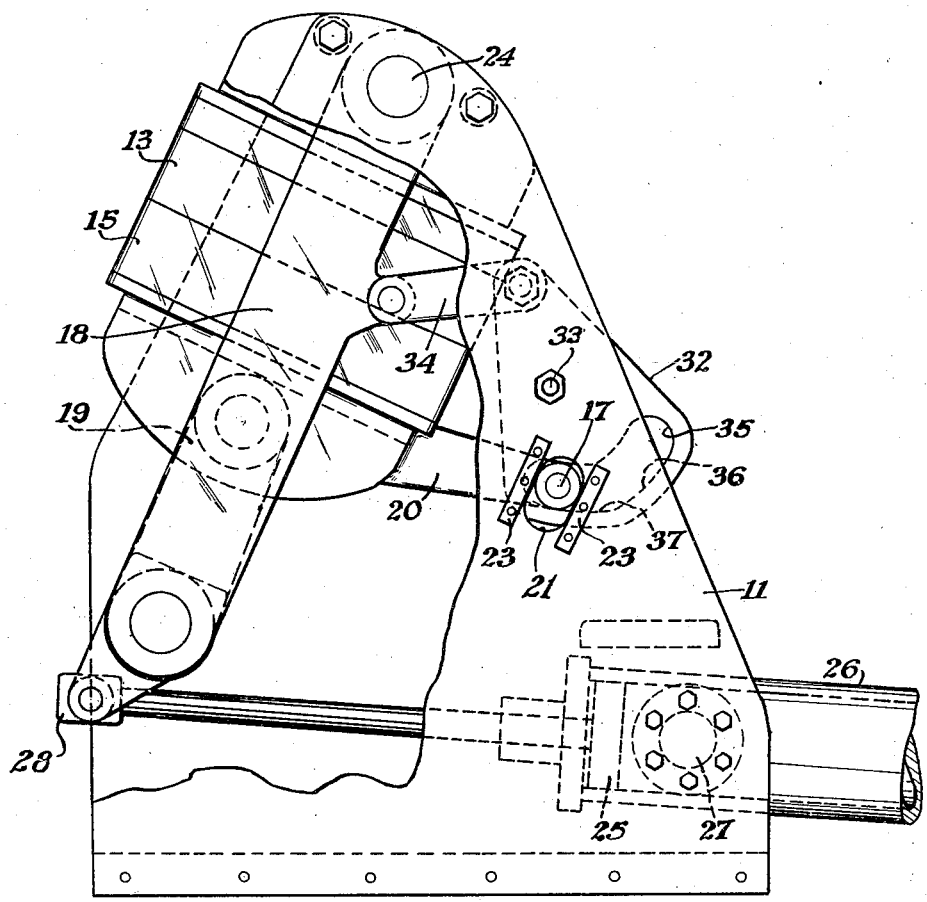
Figure 5:
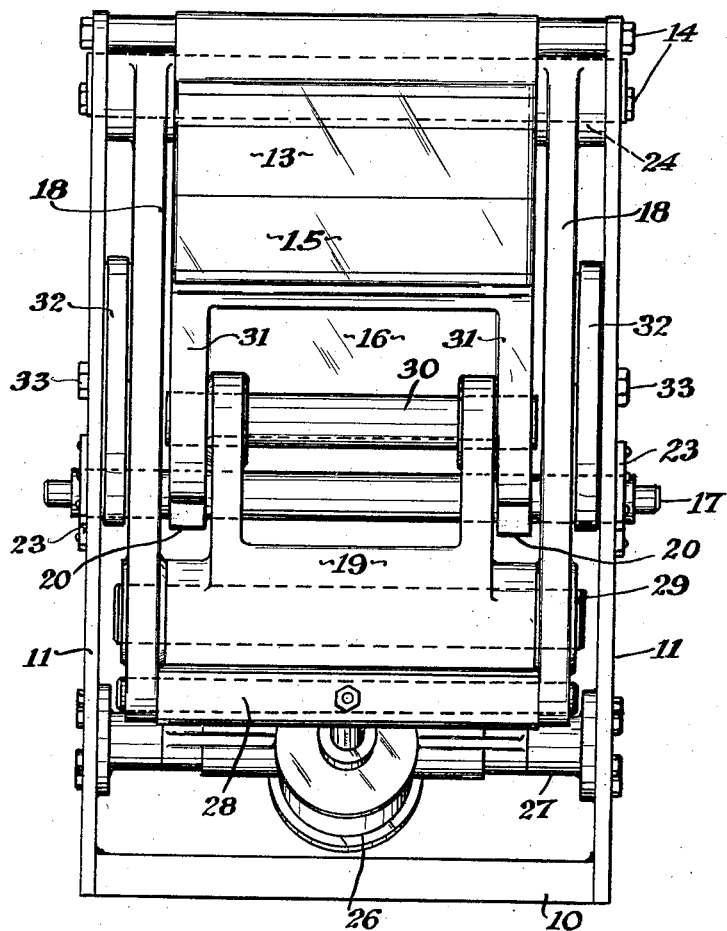

Referring now to the drawings, Fig. 1 is a side elevation of a simplified showing of a press embodying my invention, part of a side wall being broken away more clearly to illustrate the parts therebehind; Fig. 2 is a fragmentary cross section taken on the line 2—2 of Fig. 1; Figs. 3 and 4 are views similar to that of Fig. 1 but showing the parts in different relative positions; and Fig. 5 is a front elevation of the press.

In the drawings, a main frame is shown for the press which comprises a base 10 and side members 11 which may be braced by a cross member 12. The upper mold member 13 is secured to the side plates at 14 in an inclined position to present a minimum of interference with the operator.

The lower mold member 15 is rigidly secured to a movable press head 16 which, in turn, is supported by a hinge pin 17 slidably journaled in the side plates and by a suitable supporting and actuating mechanism, such as the toggle shown as comprising a pair of arms 18 and a link 19. The hinge pin is carried by rearwardly extending brackets 20 on the press head and may take the form of a rod or shaft extending across the press and through appropriate clearance openings 21 in the side plates. The shaft may be provided with anti-friction rollers 22 at each end. An inclined trackway is provided, as by the wear plates 23, at each side of the press whereby the hinge pin may travel up and down but is constrained to do so in a path normal to the plane of the parting face of the upper mold member, that is, parallel to the axis of the fixed mold, and of the movable mold when closed.

The toggle arms 18 are journaled as at 24 near the top of the side plates 11, and are forcibly driven forwardly and back, as by a hydraulic piston 25, the cylinder 26 of which is journaled in the side plates at 27. Driving connection is made by means of a cross head 28 on the piston rod which is journaled in the lower ends of the arms 18. One end of the link 19 is pivoted to the arms 18 near their lower ends at 29, and the other end of the link pivotally supports the movable mold as by means of a cross shaft 30 passing through depending brackets 31 on the press head.

The movement of the operating mechanism for the movable mold controls the position of the hinge pin 17, most conveniently through the intermediacy of an appropriate cam arrangement. To this end, a cam plate 32 may be pivoted to each of the side plates 11, at 33, and linked to the respective arm 18 of the toggle here employed, as by link members 34. A camming action is obtained between the cam plate and the hinge pin 17, this action being conveniently obtained by means of cam slots 35 in the plates through which the rollers 22 may project. The position of the rollers and of the hinge pin, along the path of travel as defined by the wear plates 23, is thus determined by the cam slot, and by a proper configuration of the slot the location of the hinge pin may be predetermined for each successive position of the arms 18. I have found that the desired operation of the press may be secured by having the hinge pin substantially stationary while the press heads are remote from each other. I obtain this result by providing a dwell by means of a substantially concentric portion of the cam slot at 36. Upon near approach of the mold members, the hinge pin rises at the same rate as the movable mold member, and, to cause it so to rise, I provide the cam slot with an inclined or eccentric portion 37 merging with the concentric portion at 38.

In a cycle of operation of the press, Fig. 1 illustrates the initial relative positions in which the lower mold member is at its lowest position and tilted forwardly for convenient access on the part of the operator. The first phase of the closing movement takes place between the positions of Fig. 1 and Fig. 3. During this phase the hydraulic piston forces the toggle arms 18 forwardly, causing the links 19 to raise the mold member, swinging it about the pivot pin 17. As the arms 18 move forwardly they rock the cam plates 32 to the position shown in Fig. 3, but, because of the dwell in the cam slot, the pivot pin remains substantially unmoved, and the mold member describes a substantially circular arc thereabout. At the end of the first phase, the lower mold member, as seen in Fig. 3, is axially aligned with the upper mold member and parallel thereto, but separated from it by a substantial amount.

In the second phase of the closing movement, the toggle arms 18 continue to swing forward under the action of the piston, and the link 19 raises the lower mold and forces it toward the upper. As shown in Fig. 4, the press is so designed that when the mold sections are forced together the toggle elements have not been moved into dead center position. The rocking of the cam plate 32 during the second phase of the operation causes the inclined portion 37 of the cam to engage the rollers 22. The hinge pin 17 is thus cammed upwardly in the trackway 23, the configuration of the cam being so correlated with the various lever arms and relative angles of the parts that the hinge pin rises in pace, or at the same speed as the movable mold member. The latter is thus maintained in axial alignment with the fixed member and approaches and meets it in parallelism.

In the opening of the press, the foregoing movements are reversed, axial and parallel alignment of the mold members being preserved until a substantial separation is had, and thenceforth the lower mold member is swung down and away from the upper to present its interior again to the operator.

It will be apparent that the press and operating mechanism therefor, here illustrated as an embodiment of my invention, are merely illustrative as numerous modifications may be made within the spirit and scope of my invention.

I claim:

1. A molding press comprising coacting press heads, one of which is movable with respect to the other, a frame carrying one of the heads, an arm pivoted to the frame, means for swinging the arm, a second arm pivoted to the first arm and to the movable head respectively, a cam pivotally mounted on the frame and having a slot therein, said frame having a guideway crossing said slot, a member attached to the movable press head and acted upon conjointly by the slot and guideway, whereby a shiftable hinge is provided for the movable head, and a link connecting the first-named arm to the movable cam.

2. A molding press having a relatively fixed upper press head, and a relatively movable lower press head, a frame carrying the upper head, a toggle arm pivoted to the frame adjacent the upper portion thereof, means acting upon the lower portion of the arm to swing it with respect to the frame, a link connecting the lower portion of said arm to the movable press head, said frame having a slot therein, a cam pivoted intermediate its ends to the frame and having a slot therein adapted to register in crossing relationship with the slot in the frame, a pin carried by the movable press head and extending through both of said slots and acted upon by each to provide a shiftable hinge pivot for the movable head, and means connecting the end of the cam remote from the slot therein to said arm.

3. A molding press having a relatively fixed head and a relatively movable head, means for swinging the relatively movable head towards and away from the fixed head, a hinge pivot for the movable head, members having a pair of crossing cam slots for receiving the hinge pivot, and means for moving one of the cam slots with relation to the other during the opening and closing movement of the press so as to shift the position of the hinge pivot during the opening and closing movements of the press.

4. In a press, a fixed mold, a movable mold, a frame supporting the fixed mold and having a guideway therein, a power operated toggle adapted to support and actuate the movable mold, a cam plate pivotally mounted on the frame, means for connecting the plate to said toggle, said plate having a cam slot in juxtaposition to the guideway, and a hinge pin carried by the movable mold and acted upon conjointly by the guideway and slot to effect a shiftable hinge for the movable mold.

5. A molding press having a relatively fixed head and a relatively movable head, means for swinging the relatively movable head towards and away from the fixed head, a frame, a cam plate pivotally mounted on the frame and operatively connected to said means, said frame having a rectilinear guideway therein, and said plate having an irregular cam slot therein, a portion of said slot being in registration with the guideway and substantially parallel thereto, and a hinge pin carried by the movable mold and acted upon conjointly by the guideway and slot to provide a shiftable hinge for the movable mold.

JAMES W. BRUNDAGE.

REFERENCES CITED

The following references are of record in the file of this patent:

UNITED STATES PATENTS

| Number | Name | Date |
| --- | --- | --- |
| 1,989,362 | Iverson | Jan. 29, 1935 |
| 2,019,888 | Bostwick | Nov. 5, 1935 |
| 2,224,336 | Bostwick | Dec. 10, 1940 |
| 2,308,977 | Iverson et al. | Jan. 19, 1943 |
| 2,355,846 | Brundage | Aug. 15, 1944 |